United States Patent Office 3,377,269
Patented Apr. 9, 1968

3,377,269
OXIDATION CATALYST COMPRISING VARIABLE DENSITY ACTIVATOR
Herman S. Bloch, Skokie, Ill., assignor to Universal Oil Products Company, Des Plaines, Ill., a corporation of Delaware
No Drawing. Continuation-in-part of application Ser. No. 369,279, May 21, 1964, which is a continuation-in-part of application Ser. No. 75,666, Dec. 14, 1960. This application June 15, 1964, Ser. No. 375,354
13 Claims. (Cl. 208—466)

ABSTRACT OF THE DISCLOSURE

A catalyst particle comprising Pt on high surface area alumina, a minor portion of said surface area comprising a number of small localized spots of Pt at a high density of the order of 10–20,000 micrograms of $Pt/m.^2$, and the remaining surface area thereof having a uniform distribution of Pt thereon at a low density of the order of 0.9–10 micrograms of $Pt/m.^2$, the total Pt content of said particle being 0.05%–0.2% by weight.

---

This application is a continuation-in-part of my copending application Ser. No. 369,279, filed May 21, 1964, which in turn is a continuation-in-part of my copending application Ser. No. 75,666, filed Dec. 14, 1960, now abandoned.

This invention relates to a novel oxidation catalyst and to its preparation and use. More particularly the invention is directed to an improved oxidation catalyst comprising a variable density activator useful for converting exhaust gas streams, such as those emanating from vehicular and stationary internal combustion engines, to less harmful products.

The desirability and importance of removing certain constituents from vehicular exhaust gases is recognized. The generally unavoidably incomplete combustion of hydrocarbon fuels by the internal combustion engine results in the generation of substantial quantities of unburned hydrocarbons and other undesirable products which are released to the atmosphere through the exhaust line. With the ever increasing number of automobiles, particularly in urban areas, the discharge of deleterious matter into the atmosphere may reach significant proportions. The undesirable combustion products include, for example, unsaturated hydrocarbons, partially oxidized hydrocarbons such as alcohols, ketones, aldehydes and acids, carbon monoxide, and various oxides of nitrogen and sulfur. Some of these undesirable products are believed to react with atmospheric oxygen, under the influence of sunlight, to produce what is now commonly referred to as smog.

The discharge of exhaust gases from automotive engines is only one source of atmospheric pollution. Although described with particular reference to the conversion of such exhaust gases, the present invention is equally well suitable for use with diesel engines, butane engines, natural gas engines and the like. Other sources of atmospheric pollution include waste material from stationary units such as large internal combustion engines for driving pumps, compressors and generators; flue gas power recovery units; exhaust fumes from various industrial operations such as the printing industry, the tanning industry and various chemical industries. For example, in the printing industry, inks, dyes and the like contain hydrocarbons and other chemical compounds which, either in the same or modified form, accumulate within the surroundings and are vented to the atmosphere by blowers or fans. In the chemical field, for example, the manufacture of phthalic anhydride by the oxidation of naphthalene frequently results in the emission of noxious gases into the atmosphere. In all such processes emitting waste gases, it is therefore desirable to oxidize such waste gases by catalytic means prior to their discharge into the atmosphere, the objective being to convert at least a substantial portion of the unburned or incompletely burned hydrocarbons and carbon monoxide into carbon dioxide and water.

With regard to automotive and other vehicular applications, the catalyst is usually disposed as a fixed particle-form bed placed in a suitable container or catalytic convertor which is installed in the engine exhaust gas line. The catalytic convertor may be of the through-flow, cross-flow or radial-flow design and may supplant or be combined with the normal acoustic muffler. Secondary or combustion air is injected ahead of the convertor inlet usually by means of an aspirator or by a suitable engine-driven compressor. The rate of secondary air flow is usually adjusted or maintained to provide from about 10% to about 30% excess air to insure reasonably high conversion levels under all conditions of driving.

An important consideration in the formulation of an exaust gas oxidation catalyst for vehicular use is to attain a relatively low ignition temperature, or threshold activation temperature, so that the conversion reactions are self-sustaining within a minimum time after startup from cold engine conditions and the emission of unconverted gases is accordingly held to a minimum. Depending on the makeup of exhaust gases and at specified conditions of combustible content and percent oxygen, all catalytic compositions are characterized by such ignition temperature, below which virtually no conversion of the exhaust gases takes place. After the catalyst bed has been brought up to operating temperature, however, the exothermic oxidation reactions will be self-sustaining even though the temperature of the incoming gases should temporarily fall below the ignition temperature. This hysteresis effect is due in part to the heat capacity of a catalyst bed and in part to the nature of the specific catalytic composition employed. Most of the exothermic heat of reaction is believed to result from the oxidation of carbon monoxide to carbon dioxide, as distinguished from the oxidation of hydrocarbons or oxyhydrocarbons.

Studies of typical urban driving patterns indicate that a large percentage of driving time is spent at engine conditions of idle and cruising speeds under about 30 miles per hour when the exhaust gas temperature is generally below about 400° F. If the particular catalyst employed under these conditions were to have an ignition temperature above 400° F., then obviously little or no conversion of the exhaust gas could be achieved. Furthermore, a considerable portion of auto commuter traffic consists in short-haul runs beginning with a cold engine; the sensible heat of the exhaust gases during the warm-up period necessarily is used to heat up the exhaust manifold, exhaust pipe convertor and catalyst bed so that a period of from about 5 minutes to an hour or more, as in a severely cold climate, is required before conversion of exhaust gases commences. All during such warm-up periods, of course, the exhaust gases pass on through the convertor essentially unchanged and are thence released to the atmosphere.

Waste gas oxidation catalysts are generally constituted in a manner similar to naphtha reforming catalysts as well as other hydrocarbon conversion catalysts in that they comprise a high surface area refractory oxide base or support such as alumina, alumina-silica, alumina-zirconia, and the like, upon which is deposited, as by precipitation or impregnation techniques, one or more activators, e.g., a catalytically active metal or metal oxide having oxidizing activity. Particularly desirable activators are the metals of the platinum family, especially platinum and palladium. These show excellent conversion activity for carbon monoxide, hydrocarbons, and oxygenated hydrocarbons over prolonged periods of time. It has been established that the ignition temperature of catalysts in which the activator comprises a platinum group metal decreases as the weight percentage of platinum group metal present, based on the total composite, is increased, up to about 5% by weight; the relationship is somewhat less than linear, perhaps approximating a hyperbolic function so that at concentrations above about 5% by weight, additional amounts of activator do not appear to effect any appreciable reduction of ignition temperature. One way, therefore, to formulate a catalyst having a suitably low ignition temperature is to fix the concentration of activator at a correspondingly high level, say in the case of platinum, at about 1% by weight, at which level the ignition temperature of the catalyst will be in the vicinity of about 350° F. However this approach is unduly expensive in commercial practice. Economic studies have shown that in order to make a packaged catalytic convertor complete with catalyst competitively attractive to the mass motorist market, the platinum content of the finished catalyst should not exceed about 0.2% by weight. Furthermore, on account of the aforesaid hysteresis effect, once the catalyst bed has been brought up to operating temperature, very good carbon monoxide and hydrocarbon conversions can be realized under all conditions of engine operation, e.g. whether at idle, accelerate, cruise or decelerate, with platinum contents as low as 0.05%–0.1% by weight based on the finished catalyst. It is clear that under normal "steady-state" conditions, amounts of platinum substantially in excess of this range would be mere surplusage. In fact, extensive tests have demonstrated the operability of catalysts containing as little as 0.01% platinum. However, catalysts containing below about 0.01% platinum show a marked decrease in stability or ability to sustain high exhaust gas conversions, in the face of contamination by lead and lead compounds which are inevitably present in exhaust gases from internal combustion engines operating on gasoline containing tetraethyl lead. In view of the foregoing, the optimum platinum concentration of an exhaust gas oxidation catalyst employing platinum as the activator lies within the range of about 0.05% to about 0.2% by weight; however, the ignition temperature of such catalysts is unsatisfactorily high for use with intermittently operated internal combustion engines. A basic shortcoming, then, of platinum catalysts in particular, and of the catalysts in which the activator comprises other metals in general, is that those containing amounts of activator low enough to be commercially feasible have relatively high ignition temperatures, while those which have satisfactorily low ignition temperatures must contain too much activator to be practical.

The present invention is directed to a novel oxidation catalyst possessing remarkably low ignition temperature but containing only a very low percentage by weight of activator. The catalyst is in the form of small particles of a porous high surface area refractory oxide base or support such as alumina, alumina-silica, alumina-zirconia, etc., composited with one or more activators such as platinum, cobalt, copper, iron, etc. having oxidizing activity. The essence of the invention resides in the particular distribution of activator on each individual catalyst particle. In conventional supported catalysts the activator is distributed substantially uniformly over the surface of the particle as a regular pattern of extremely small, closely spaced crystals of metal activator which may exist as the free metal, metal oxide, sulfide, halide or in some chemical or physical complex with the refractory carrier itself, depending on the particular composition of the catalyst and its manner of preparation. In accordance with the present invention, however, the activator is distributed non-uniformly over the surface of the particle; in other words, it is characterized as having a variable density. As used in the specification and claims hereof, the term "density" of activator refers to its surface concentration expressed as weight units per unit area of surface of the support, as for example, micrograms of platinum per square meter of surface area. The surface area of the refractory oxide support is defined as that conventionally determined by nitrogen BET analysis. The catalyst is prepared in such a manner that the surface of each catalyst particle comprises at least one, and preferably a plurality of, small localized spots of relatively high activator density, and the remaining surface thereof carries a fairly uniform distribution of activator at a substantially lower density. The sum of the areas of such high density regions constitutes a minor portion of the total surface area of the particle, and the total activator content of the particle does not exceed a commercially practical limit; where the activator is platinum, the total activator content of each particle will be in the range of from about 0.05% to about 0.2% by weight. A catalyst bed composed of such variable density platinum particles operates as follows: at the lowest temperatures, the combustion starts at those localized sites of each particle having the higher platinum density. These sites generate enough heat to soon raise the temperature of the entire particle to the ignition temperature of its lower platinum density region. Therefore the heating-up mechanism takes place by way of many small localized high temperature zones which are distributed throughout the volume of the catalyst bed and which come into being more or less simultaneously. Thus from a number of small localized spots of high platinum density, the resulting ignition chain is quickly propagated throughout the entire catalyst bed, until the latter is operative at the higher temperatures necessary for utilization of catalytic areas containing the lower platinum density. In a preferred form of the invention, the catalyst particles in the bed have about the same size and shape, and each particle contains more or less the same number of high density spots. This means that, on a statistical average, the high density spots are uniformly dispersed throughout the entire volume of the bed whereby to promote the most efficient interparticle transfer of heat by radiation and conduction.

One embodiment of this invention relates to a method of making a particle-form oxidation catalyst which comprises preparing small solid plastic particles containing a catalytic activator having oxidizing activity; commingling said plastic particles with a hydrosol of a refractory oxide; gelling the resultant hydrosol-plastic particle mixture and forming hydrogel particles of substantially larger size than the plastic particles, each hydrogel particle containing at least one plastic particle; and calcining the hydrogel particles at a temperature and for a time sufficient to burn off the plastic to yield refractory oxide particles, the surface of each comprising a localized spot of relatively high activator density.

In a more specific aspect of the preparation of the catalyst, the hydrogel particles, before calcination thereof, are impregnated with an aqueous solution containing a catalytic metal having oxidizing activity and the impregnated hydrogel particles are than calcined at a temperature and for a time sufficient to burn off the plastic to form refractory oxide particles, the surface of each comprising one or more localized spots of relatively high catalytic metal density and the remaining surface thereof having a uniform distribution of catalytic metal at a lower density.

Another embodiment of the invention is directed to an oxidation catalyst comprising platinum on a high surface alumina particle having a surface area in the range of about 120 to about 220 square meters per gram, a minor portion of the surface area comprising one or more localized spots of platinum each at a relatively high density averaging in the range of about 10 to about 20,000 micrograms of platinum per square meter of surface area, and the remaining surface area thereof having a fairly uniform distribution of platinum thereon at a relatively low density averaging in the range of about 0.9 to about 10 micrograms of platinum per square meter of surface area, the ratio of such high density to such low density being at least 3, and the total platinum content of the finished particle being in the range of about 0.05% to about 0.2% by weight.

Another embodiment of this invention concerns a process for burning combustibles contained in a waste gas stream which comprises contacting the stream, in admixture with oxygen and at oxidation temperature, with a bed of refractory oxide particles containing one or more catalytic metals having oxidizing activity, the surface of each particle comprising one or more localized spots of relatively high catalytic metal density and the remaining surface thereof having a fairly uniform distribution of a catalytic metal at lower density.

The use of a catalyst bed composed of catalyst particles having variable density activator is quite different from the known concept of employing an active "core" of ignitor catalyst disposed in a main catalyst bed of lower activity. Arrangements of the latter type contain a cluster or lumped mass of high activity particles designed to function as a zone of high heat capacity and persistent heat retentivity with minimum heat loss therefrom, whereby an active ignition source within the catalytic convertor is maintained for a considerable time after the engine is turned off. Since a plurality of high activity particles are bunched together, the cold body/hot body contact area ratio is reduced, and a hot particle located centrally within the group can see only other hot particles rather than cold ones. This means that substantially less heat flow can occur and the heat propagation effect is largely retarded. The present invention, on the other hand, seeks to maximize heat transfer from each high density site to the remainder of the particle and also to the surrounding particles by conduction and radiation.

While the preferred catalyst composition of this invention is platinum on alumina, it will be appreciated that the basic principle of variable activator density is applicable to catalysts of other compositions, including those comprising different bases and/or activators. The various activators or catalytically active metals which may be composited with the refractory oxide carrier, in addition to or in lieu of platinum-group metals of the Periodic Table, may comprise, for example: vanadium, manganese, chromium, molybdenum, tungsten, members of the iron group, copper, silver and gold. A particular metal may be employed individually or in combination with any of the foregoing metals; however, platinum is desired by reason of its ability to provide sustained high activity for the oxidation of carbon monoxide, hydrocarbons and oxygenated hydrocarbons. Therefore a desired catalyst may comprise the following: platinum, palladium, other noble metals such as iridium, ruthenium and rhodium, various mixtures including platinum-iron, platinum-cobalt, platinum-nickel, palladium-iron, palladium-cobalt, palladium-nickel, platinum-palladium, palladium-copper-cobalt, platinum - copper-lithium-cobalt, platinum-cobalt-copper, copper-cobalt-nickel-platinum, platinum-palladium-cobalt, manganese-platinum, platinum-cobalt-manganese, lithium-platinum-cobalt, copper-cobalt-lithium. The high density sites may consist of the same activator, or mixture of activators, as the uniform low density regions of each particle. However, it is also within the scope of the invention to provide high density sites comprising one activator and low density regions comprising another activator. For example, the high density activator may be platinum, and the low density activator may be iron, and conversely.

In the preparation of the instant catalyst, the activator is incorporated in two steps. Starting with a conventionally formed hydrosol of the desired refractory oxide, there is commingled with the hydrosol small solid plastic particles containing the activator, preferably as a thermally decomposable compound of the activator. The hydrosol-plastic particle mixture is then converted, by conventional methods, to hydrosol particles of substantially larger size than the plastic particles, and then gelled, each gel particle containing one or more plastic particles. The gel particles are dried and impregnated with a solution containing the activator in such concentration as to provide a uniform low density distribution of activator over the surface of each gel particle. The gel particles are then calcined at a temperature and for a time sufficient to burn off the plastic and decompose the activator compound contained in the plastic. Removal of the organic inclusion by burning leaves macroholes or channels in the refractory oxide particle permeable to reactant gases, and the catalytically active metal remains as a highly localized spot of high density deposited on the walls of the hole or channel left by removal of organic material. The amount of activator per particle of plastic, the size of the plastic particles, and the plastic content of the catalyst sol determine the distribution and local density of the activator in the finished catalyst.

The plastic particles may be formed of thermoplastic or thermo-setting resins. A preferred plastic is polyethylene because it is easily shaped into small particles, its low melting point readily permits the addition of activator thereto in the molten state, and it is easily decomposed at ordinary calcination temperatures. Other suitable plastics include polypropylene, polystyrene, styrene-acrylonitrile, phenol-formaldehyde, urea-formaldehyde, epoxy resins, polyurethanes, vinyl resins such as polyvinyl chloride and polyvinyl acetate, acrylonitrile-butadiene-styrene polymers, polyamides, and polyfluorocarbons such as Teflon and Kel-F.

Other combustible inclusions (for example, carbon black or sulfur) or inert inclusions may be incorporated in the plastic to make its specific gravity approximately equal to that of the hydrosol, so that the plastic will maintain a uniform dispersion in the hydrosol bulk and droplets prior to gelation.

While the activator or catalytically active metal may be incorporated into the plastic as a powdered free metal, it is preferred that it be a thermally decomposable compound of the metal. In the case of the iron group metals, such thermally decomposable compound may be the nitrate or carbonate thereof. In the case of platinum, for example, such thermally decomposable compound may be ammonium chloroplatinate, platinum sulfide, a platinum oxide or a platinum amine complex. The preparation of plastic particles containing the activator may be accomplished in various ways. One is to encapsulate small crystals of activator with plastic. Another is to agitate a slurry of finely divided activator in a molten mass of thermoplastic and spray or extrude the liquid-solid mixture into a quenching or setting medium. Another is to intimately mix finely divided activator with a thermo-setting plastic monomer, subject the mixture to polymerization conditions, and then cut or grind the resulting solid mass into fine particles of the desired size. The quantity of activator per plastic particle will generally range from about 0.1% by weight to about 10% by weight. Where the activator is platinum, a preferred range therefor is 0.1%–5% by weight of platinum. The physical shape of the plastic particles may be in the form of granules such as spheres, spheroids, ellipsoids, cylinders, cubes or irregularly shaped granules, or the particles may be elongated threads as where the plastic is die-extruded. A particularly preferred shape of plastic particles is microbeads or microspheres having a diameter in the range of from about 10 to about 200 microns.

The refractory oxide base or support is conventionally prepared from a hydrosol thereof. A preferred support comprises a major proportion of alumina, the term "alumina" being intended to include porous aluminum oxide in any of its several states of hydration. The support may be essenetially pure alumina or it may be a composite thereof with at least one other refractory oxide such as silica, zirconia, magnesia, titania and the like, and it may also comprise a combined halogen such as fluorine or chlorine. Minor amounts of silica or titania or halogen enhance the cracking activity of the catalyst, zirconia improves its attrition resistance, and magnesia increases its lead stability in some instances. Such added oxide or oxides may be present in the finished catalyst in an amount within the range of about 0.1% to about 30% by weight, preferably within the range of about 1% to about 10% by weight. Where the support comprises halogen, the halogen may be present in an amount within the range of about 0.1% to about 5% by weight. An alumina hydrosol may be prepared by dissolving in water an aluminum salt such as aluminum chloride, aluminum sulfate, aluminum nitrate, or by digesting aluminum metal in a strong mineral acid such as hydrochloric acid, and then raising the pH to the desired value by addition of ammonia or other alkaline medium. Other variables affecting the properties of the sol and of the finished carrier include the aluminum:anion ratio, pH, ionic concentration, specific aging treatments, and the like, and these may be appropriately controlled by known techniques. When a multi-oxide support is desired this may be prepared by various suitable methods including successive precipitation or coprecipitation techniques; for example, silica may be incorporated by adding an alkali metal silicate to an alumina sol, or by adding an aluminum salt solution to a freshly prepared or pre-aged silica sol; zirconium may be incorporated by adding a zirconyl halide to an alumina sol. The activator-containing plastic particles are then added to and uniformly dispersed in the sol, as by agitation, prior to formnig the sol particles and gelation.

Gelation of the sol-plastic particle mixture may be carried out by spraying or injecting the sol into a basic precipitating medium such as ammonia or an amine, or by the well-known oil drop method, utilizing an internal precipitant such as urea or urea-hexamethylenetetramine, following the procedure set forth in U.S. Patent 2,620,314. While the finished catalyst particles may have any physical shape such as spheres, cylinders, pills, or extrudates, a preferred form of support is the sphere. Alumina or alumina-containing spheres may be readily prepared by the oil drop method; these spheres may be further given atmospheric or pressure aging treatment, under controlled conditions of pH, temperature and time, to develop their strength, surface area, pore volume and density. The gelled spheres may contain from 1 to about 50 or more plastic particles, depending on their relative size and activator content of the latter. The preferred diameter range of the finished catalyst spheres is about 0.03 to about 0.3 inch, the usual sizes being 1/16 inch or 1/8 inch. Diameters below this range may result in excessive catalyst loss or plugging of the catalyst retaining screens within the convertor, and diameters above this range may cause channelling, non-uniform space velocity, and poor fluid-solid contact, at least in the case of the 1-pound to 10-pound catalyst loadings commonly employed in vehicular exhaust gas convertors.

After the plastic particle-containing hydrogel particles are formed, they may be dried and impregnated with activator solution, or the drying step may be omitted and the undried particles may be directly impregnated with activator solution. The drying operation can be carried out in a batch oven or continuous belt drier at a temperature, for example, in the range of about 200°–400° F. The purpose of the impregnating step is to provide a low density distribution of activator over the surface of each catalyst particle. When the activator is platinum, the impregnating solution may be an aqueous solution of ammonium chloroplatinate, platinous chloride, platinic chloride, dinitritodiamino-platinum, etc. When the catalyst is to contain other metallic activators, the impregnating solution may comprise a soluble nitrate, sulfate, chlorate, chloride or carbonate of the desired catalytically active metal. The activator density can be readily controlled by properly adjusting the concentration of the impregnating solution.

The impregnated particles are then calcined at a temperature and for a time sufficient to burn off the plastic and decompose the thermally decomposable activator compound. Generally speaking, calcination temperatures of 800°–1400° F. and exposure times of 10 minutes to 4 hours will be adequate therefor. When the organic matter is burned off, the catalytically active metal will be left behind as a highly localized spot of high density deposited on the walls of the hole or channel left by removal of the organic material.

The relative amounts of high density activator and low density activator are proportioned to provide, as to each catalyst particle, a total activator content generally within the range of about 0.03% to about 10% by weight; when the activator is platinum or other platinum group metal, the most effective and economical activator content, as above described, is about 0.05% to about 0.2% by weight. With respect to the relative densities of activator as between the high density sites and the low density regions, the high activator density should be at least twice the low density, said densities being expressed in terms of weight units per unit of particle surface area. When platinum is employed as both the high density activator and low density activator, the high density is preferably at least three times the low density; for example, in a platinum-alumina catalyst prepared according to this invention, the ratio of the average high density to the average low density is preferably at least 3, and still more preferably is within the range of about 3 to about 2,000. A minimum density ratio of 2–3 is necessary in order that the heating effect arising from a multiplicity of small high temperature zones is self-propagating in minimum time.

The physical properties of the instant catalyst, as well as its activity and stability, are dependent to some extent on the specific steps and conditions involved in preparing the refractory oxide support. When the support comprises 90% or more by weight of alumina, the finished catalyst will have a surface area of from about 120 to about 220 square meters per gram and an apparent bulk density (ABD) of from about 0.15 to about 0.50 gram per cubic centimeter. Higher surface areas of up to about 500 square meters per gram may be obtained when increasing proportions of silica are incorporated in the support. Representative spherical platinum-alumina oxidation catalysts prepared in accordance with this invention have the following characteristics:

| | |
|---|---|
| Sphere diameter, inches | 0.30–0.3 |
| Surface area, m.²/gm. | 120–220 |
| ABD, gm./cc. | 0.15–0.50 |
| No. high Pt density sites/sphere | 2–50 |
| High Pt density, $D_H$, μg Pt/m.² (av.) | 10–20,000 |
| Low Pt density, $D_L$, μg Pt/m.² (av.) | 0.9–10 |
| $D_H/D_L$ (av.) | 3–2,000 |
| Total Pt content, each sphere, weight percent | 0.05–0.2 |

The following examples are given to illustrate the present invention and to indicate the benefits afforded through the use thereof. It is not intended that the invention be limited to the specific reagents, catalyst compositions, concentrations and/or conditions described in the examples.

EXAMPLE I

The ignition temperature of a catalyst sample is determined as follows: a 10 cubic centimeter bed of catalyst is placed in an electrically heated Vycor tube, through which is passed a mixture of carbon monoxide and air under substantially atmospheric pressure, the flow rates thereof being regulated at 200 cubic centimeters per minute of carbon monoxide and 4800 cubic centimeters per minute of air. Means are provided for measuring and recording the bed inlet and outlet temperatures. The Vycor tube is gradually increased in temperature by adjusting the electrical heat input thereto. So long as ignition does not occur, the bed inlet and outlet temperatures, although both are increasing, remain equal. When the ignition temperature is reached, the outlet temperature will suddenly begin to rise at a more rapid rate than the inlet temperature until the combustion process lines out, whereupon the inlet and outlet temperatures will again continue to rise, assuming that additional heat is still being added to the system, but at equal rates. The point of divergence between inlet and outlet temperatures is then taken as the ignition temperature.

A conventional spherical platinum-alumina catalyst, designated as "A," is prepared by the general method of dissolving aluminum pellets in hydrochloric acid to form an alumina hydrosol. The sol is treated in a manner similar to the procedure set forth in U.S. Patent No. 2,620,314, involving the mixing of hexamethylenetetramine therewith and dropping into an oil bath maintained at about 190° F. to form spheres 1/16 inch in diameter. The spheres are aged in oil and then washed in an aqueous solution of ammonia, the ammonium hydroxide washed spheres being subsequently dried. The spheres are impregnated with platinum by soaking in a dilute solution of ammonium chloroplatinate. The platinum-impregnated spheres are then calcined at 1000° F. for 2 hours. This conventional preparation yields catalyst spheres comprising about 0.1% platinum by weight uniformly distributed over the surface thereof.

A second spherical platinum-alumina catalyst, designated as "B," is prepared in accordance with the invention. Polyethylene microbeads, having a diameter in the range of 30–80 microns and containing 0.5% by weight of ammonium chloroplatinate, are added to an alumina hydrosol in an amount of 5% by weight. The sol is then oil-dropped and aged in the conventional manner to form hydrogel spheres 1/16 inch in diameter. The spheres are oven-dried at 300° F. and impregnated with an aqueous solution of ammonium chloroplatinate in an amount and in a manner such that the platinum from this source imparts a uniform distribution of 0.05% platinum by weight to the dried spheres. The spheres are then calcined in air at a temperature of 1000° F. for 2 hours. In the course of this step, the polyethylene is burned off and the ammonium chloroplatinate contained therein is decomposed, leaving a number of high platinum density sites distributed throughout each sphere. The total platinum content of each sphere is the same as that of catalyst A, namely 0.1% platinum by weight.

Catalysts A and B are then each subjected to the carbon monoxide oxidation test as described above. Catalyst A has an ignition temperature of 415° F. and catalyst B has an ignition temperature of 390° F. It is clear that a substantially lower ignition temperature can be obtained with the variable platinum density catalyst than with the conventional catalyst having a completely uniform distribution of platinum with respect to each spherical particle, notwithstanding the fact that the total platinum contents are the same in each instance.

EXAMPLE II

A spherical platinum-iron-alumina catalyst, designated as C, is prepared in accordance with the invention. Polyethylene microbeads, having a diameter in the range of 30–80 microns and containing 0.5% by weight of ammonium chloroplatinate, are added to an alumina hydrosol in the amount of 5% by weight. The sol is then oil-dropped and aged in the conventional manner to form hydrogel spheres 1/16 inch in diameter. These spheres are then dried and impregnated with an aqueous solution of ferric nitrate in an amount and in a manner such that the iron from this source imparts a uniform distribution of 0.08% by weight of iron to the dried spheres. The spheres are then calcined at 1000° F. for 2 hours.

Catalyst C and catalysts A and B of Example I are then tested under exhaust gas oxidation conditions. Beds of catalysts A, B and C, disposed in identical catalytic afterburners equipped with air aspirators, are separately installed in the exhaust line of a passenger automobile and tested under various operating conditions. In one test, the automobile is run on a chassis dynamometer through a standard cycle including acceleration, low speed cruise, further acceleration, high speed cruise, deceleration and idle, the inlet and outlet gases from the catalyst bed being collected and analyzed for hydrocarbon and carbon monoxide content during each portion of the cycle, and the overall weighted average conversions during the entire cycle being calculated. These weighted averages are given in the table below as those of "cyclic" operation. In another series of tests, the three catalyst beds are separately tested under steady idling, steady 30 m.p.h. cruise, and steady 60 m.p.h. cruise, the first two providing low inlet temperatures to the catalyst bed and the third providing high inlet temperatures. In all cases a fuel containing 3 milliliters per gallon of tetraethyl lead fluid was used. The results obtained are shown below:

| Engine Operation | Percent Conversion | | | | | |
|---|---|---|---|---|---|---|
| | Catalyst A | | Catalyst B | | Catalyst C | |
| | Hydrocarbon | CO | Hydrocarbon | CO | Hydrocarbon | CO |
| Cyclic | 87 | 80 | 92 | 81 | 89 | 79 |
| Idle | 5 | 15 | 76 | 77 | 73 | 75 |
| 30 m.p.h. cruise | 15 | 60 | 91 | 99 | 97 | 97 |
| 60 m.p.h. cruise | 90 | 90 | 89 | 86 | 87 | 88 |

It will be seen that while catalysts A, B and C are nearly equivalent under high temperature conditions, catalysts B and C are markedly superior at low temperature conditions of idle and low-speed cruise.

I claim as my invention:

1. Method of making a particle-form oxidation catalyst which comprises preparing small solid plastic particles containing a catalytic activator having oxidizing activity, said plastic being decomposable at calcination conditions; commingling said plastic particles with a hydrosol of a refractory oxide; gelling the resultant hydrosol-plastic particle mixture and forming hydrogel particles of substantially larger size than the plastic particles, each hydrogel particle containing at least one plastic particle; and calcining the hydrogel particles at a temperature and for a time sufficient to burn off the plastic to yield refractory oxide particles, the surface of each comprising a localized spot of relatively high activator density.

2. Method of making a particle-form oxidation catalyst which comprises preparing small solid plastic particles containing a thermally decomposable compound of a catalytic metal having oxidizing activity, said plastic being decomposable at calcination conditions; commingling said plastic particles with a hydrosol of a refractory oxide; gelling the resultant hydrosol-plastic particle mixture and forming hydrogel particles of substantially larger size than the plastic particles, each hydrogel particle containing at least one plastic particle; and calcining the hydrogel particles at a temperature and for a time sufficient to burn off the plastic and decompose said compound to yield refractory oxide particles, the surface of each comprising a localized spot of relatively high catalytic metal density.

3. The method of claim 2 wherein said metal is platinum.

4. The method of claim 2 wherein said refractory oxide is alumina.

5. Method of making a particle-form oxidation catalyst which comprises preparing small solid plastic particles containing a thermally decomposable compound of a catalytic metal having oxidizing activity, said plastic being decomposable at calcination conditions; commingling said plastic particles with a hydrosol of a refractory oxide; gelling the resultant hydrosol-plastic particle mixture and forming hydrogel particles of substantially larger size than the plastic particles, each hydrogel particle containing at least one plastic particle; drying the hydrogel particles; impregnating the dried hydrogel particles with an aqueous solution containing a catalytic metal having oxidizing activity; and calcining the impregnated hydrogel particles at a temperature and for a time sufficient to burn off the plastic and decompose said compound to yield refractory oxide particles, the surface of each comprising a localized spot of relatively high catalytic metal density and the remaining surface thereof having a uniform distribution of catalytic metal at lower density.

6. Method of making a particle-form platinum-alumina catalyst which comprises preparing small solid plastic particles containing a thermally decomposable platinum compound, said plastic being decomposable at calcination conditions; commingling said plastic particles with an alumina hydrosol; gelling the resultant hydrosol-plastic particle mixture and forming alumina hydrogel particles of substantially larger size than the plastic particles, each hydrogel particle containing a plurality of plastic particles; and calcining the hydrogel particles at a temperature and for a time sufficient to burn off the plastic and decompose said platinum compound to yield platinum-alumina particles, the surface of each particle comprising a number of localized spots of relatively high platinum density.

7. Method of making a particle-form platinum-alumina catalyst which comprises preparing small solid plastic particles containing a thermally decomposable platinum compound, said plastic being decomposable at calcination conditions; commingling said plastic particles with an alumina hydrosol; gelling the resultant hydrosol-plastic particle mixture and forming alumina hydrogel particles of substantially larger size than the plastic particles, each hydrogel particle containing a plurality of plastic particles; drying the hydrogel particles; impregnating the dried hydrogel particles with an aqueous solution containing platinum; and calcining the hydrogel particles at a temperature and for a time sufficient to burn off the plastic and decompose said platinum compound to yield platinum-alumina particles, the surface of each particle comprising a number of localized spots of relatively high platinum density and the remaining surface thereof having a fairly uniform distribution of platinum at lower density.

8. Method of claim 7 wherein said plastic particles are substantially spherical and have a diameter in the range of 10–200 microns.

9. Method of claim 7 wherein the finished platinum-alumina particles are substantially spherical and have a diameter in the range of 0.03–0.3 inch.

10. Method of claim 7 wherein said plastic is polyethylene.

11. Method of claim 7 wherein said calcination temperature is in the range of 800°–1400° F.

12. A catalyst prepared by the method of claim 1.

13. A catalyst prepared by the method of claim 7.

References Cited

UNITED STATES PATENTS

| | | | |
|---|---|---|---|
| 2,071,119 | 2/1937 | Harger | 23—2.2 |
| 2,643,980 | 6/1953 | Houdry | 252—466 |
| 2,805,206 | 9/1957 | John et al. | 252—448 |
| 2,927,902 | 3/1960 | Cramer et al. | 252—466 |
| 2,928,792 | 3/1960 | Betrolacini | 252—466 |
| 2,929,792 | 3/1960 | Arnold et al. | 252—448 |
| 3,033,800 | 5/1962 | Elliot et al. | 252—466 |
| 3,254,966 | 7/1966 | Bloch et al. | 23—2.2 |
| 3,259,589 | 6/1966 | Michalko | 252—466 |

FOREIGN PATENTS

| | | |
|---|---|---|
| 686,988 | 5/1964 | Canada. |

DANIEL E. WYMAN, *Primary Examiner.*

P. E. KONOPKA, *Assistant Examiner.*